US010418838B2

(12) United States Patent
Lee et al.

(10) Patent No.: US 10,418,838 B2
(45) Date of Patent: Sep. 17, 2019

(54) WIRELESS POWER CHARGING APPARATUS FOR PORTABLE ELECTRONIC DEVICE

(71) Applicant: Samsung Electronics Co., Ltd., Suwon-si (KR)

(72) Inventors: Jungyub Lee, Yongin-si (KR); Dohyuk Ha, Gwacheon-si (KR); Junsig Kum, Yongin-si (KR); Youngju Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 693 days.

(21) Appl. No.: 15/044,352

(22) Filed: Feb. 16, 2016

(65) Prior Publication Data

US 2016/0241077 A1 Aug. 18, 2016

(30) Foreign Application Priority Data

Feb. 16, 2015 (KR) ........................ 10-2015-0023470

(51) Int. Cl.
*H02J 7/02* (2016.01)
*H01F 27/36* (2006.01)
*H02J 50/10* (2016.01)
*H02J 7/00* (2006.01)
*H01F 38/14* (2006.01)

(52) U.S. Cl.
CPC .............. *H02J 7/025* (2013.01); *H01F 27/36* (2013.01); *H02J 50/10* (2016.02); *H01F 38/14* (2013.01); *H02J 7/0042* (2013.01); *H02J 2007/0096* (2013.01)

(58) Field of Classification Search
CPC .. H02J 7/025; H02J 17/00; H02J 5/005; H02J 5/50
USPC ........................................... 320/108; 307/104
See application file for complete search history.

(56) References Cited

U.S. PATENT DOCUMENTS

| | | | |
|---|---|---|---|
| 2009/0303693 A1* | 12/2009 | Mao ...................... | H02J 7/0027 361/818 |
| 2012/0223595 A1* | 9/2012 | Oodachi ................. | H02J 5/005 307/104 |
| 2014/0191587 A1* | 7/2014 | Van Goor ............ | H04B 5/0012 307/104 |

FOREIGN PATENT DOCUMENTS

| | | |
|---|---|---|
| KR | 20130000246 | 1/2013 |
| WO | 2013/179284 | 12/2013 |

* cited by examiner

*Primary Examiner* — David V Henze-Gongola
(74) *Attorney, Agent, or Firm* — The Farrell Law Firm, P.C.

(57) ABSTRACT

According to various embodiments of the present disclosure, disclosed is a wireless power charging apparatus that includes a transparent dielectric body including a cavity for accommodating an electronic device, a transparent conductor provided on a wall of transparent dielectric configured to substantially block wireless power to outside the cavity, and at least one frequency filtering region disposed in the transparent conductor configured to perform at least one of pass a communication frequency of the electronic device and substantially block the wireless power to outside the cavity.

19 Claims, 19 Drawing Sheets

WIRELESS POWER CHARGING APPARATUS FOR PORTABLE ELECTRONIC DEVICE

RELATED APPLICATION(S)

This application claims the priority under 35 U.S.C. § 119(a) to Korean Application Serial No. 10-2015-0023470, which was filed in the Korean Intellectual Property Office on Feb. 16, 2015, the entire content of which is hereby incorporated by reference.

BACKGROUND

Various embodiments of the present disclosure relate to a wireless power charging apparatus and, more specifically, to a wireless power charging apparatus for a portable electronic device.

With the development of portable electronic devices (e.g., smart phones, wearable electronic devices, etc.), relevant technologies have also rapidly progressed. Battery packs of portable electronic devices, which are used as power supply means, have to be periodically recharged. To this end, wired cables (e.g., charging cable, travel adapter, etc.) are directly connected to interface connector ports of the electronic devices in the related art. However, with such wired charging methods the charging cables have to be connected to the electronic devices to charge the electronic devices. Accordingly, in recent years, wireless power charging apparatuses that do not require connecting charging cables to the electronic devices have become popular. In response to this trend, device makers have made efforts to develop wireless power charging apparatuses with excellent charging efficiency.

Some wireless power charging apparatuses include a cavity where an electronic device is accommodated for the purpose of charging in order to charge small portable electronic devices such as wearable devices. The wireless power charging apparatuses may include a conductor that is disposed in the cavity such that wireless power (charging frequency) radiation is minimized outside the charging apparatus. Accordingly, the wireless power emitted from a power transmission antenna located in the cavity is received through a power reception antenna of an electronic device to efficiently charge the battery of the electronic device.

However, these wireless power charging apparatuses are completely sealed by the conductor while charging so that status information (charging, or otherwise) of the electronic device cannot be seen. In addition, an electronic device used for communication cannot perform a communication operation due to degradation in radiation efficiency of its antenna because the electronic device is sealed by the conductor while being charged.

SUMMARY

Various embodiments of the present disclosure may provide a wireless power charging apparatus for a portable electronic device.

Various embodiments of the present disclosure may provide a wireless power charging apparatus for charging a portable electronic device, where state information of the electronic device being charged can be seen from outside of the charging apparatus.

Various embodiments of the present disclosure may provide a wireless power charging apparatus for a portable electronic device that enables the electronic device to communicate with an external device outside the wireless power charging apparatus even when the electronic device is being recharged inside the wireless power charging apparatus, thereby enhancing user convenience.

According to various embodiments, a wireless power charging apparatus may include a transparent dielectric body including a cavity for accommodating an electronic device, a transparent conductor provided on a wall of transparent dielectric configured to substantially block wireless power to outside the cavity, and at least one frequency filtering region disposed in the transparent conductor configured to perform at least one of pass a communication frequency of the electronic device and substantially block the wireless power to outside the cavity.

According to various embodiments, a wireless power charging apparatus may include a bottom plate, a side plate that has a pre-determined height along a periphery of the bottom plate and forms a cavity for accommodating an electronic device, and a cover provided on an upper portion of the side plate that is configured to be able to open and close. The cover may close to seal the cavity when the electronic device is being charged. The side plate may comprise a transparent dielectric in the shape of the side plate, a transparent conductor provided on an inner or outer wall of the transparent dielectric configured to substantially block a wireless power within the cavity from being radiated outside the cavity, and at least one frequency filtering region disposed in the transparent conductor configured to perform at least one of pass a communication frequency of the electronic device and substantially block the wireless power to outside the cavity.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
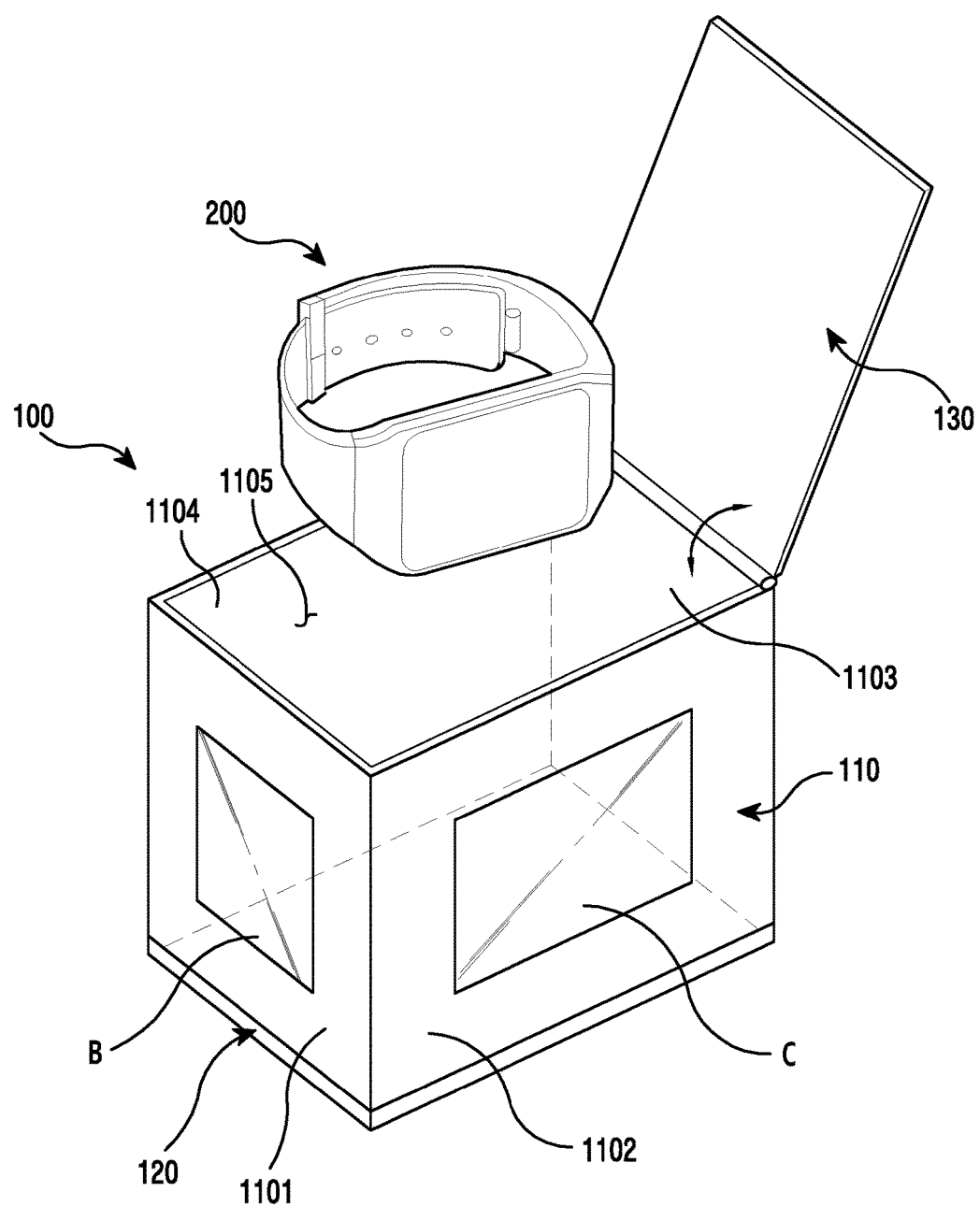
FIG. 1 is a perspective view of a wireless power charging apparatus according to various embodiments of the present disclosure.

Hereinafter, various embodiments of the present disclosure will be described in connection with the accompanying drawings. Specific examples are illustrated in the drawings and described in the description, but those examples may be modified in various forms in accordance with the teachings of the present disclosure. Moreover, the described examples are not intended to limit the present disclosure to specific embodiments, and it should be appreciated that there are many changes, equivalents and substitutions that belong to the technical scope of the present disclosure. In the description of the drawings, identical or similar reference numerals are used to designate identical or similar elements.

The terms "include," "comprise," or "have" refer to the existence of a corresponding disclosed function, operation or component that can be used in various embodiments of the present disclosure. In the present disclosure, terms such as "include," "comprise," or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

The term "and/or" used in various embodiments of the present disclosure includes any or all of combinations of listed words. For example, the expression "A and/or B" may be just A, just B, or both A and B.

The expressions such as "first", "second", or the like used in various embodiments of the present disclosure may modify various component elements in the various embodiments but may not limit corresponding component elements. For example, the above expressions do not limit the sequence and/or importance of the elements. The expressions may be used to distinguish a component element from another component element. For example, a first user device and a second user device indicate different user devices although both of them are user devices. Accordingly, a first element may be termed a second element, and similarly, a second element may be termed a first element without departing from the scope of the present disclosure.

When it is described that when a first element "is connected to" or "is in contact with" a second element, it should be understood that although the first element may be directly connected to the second element, one or more other elements may be interposed therebetween. Conversely, when a first element is "directly coupled" or "directly connected" to a second element, it should be understood that there is no other element between the first element and the second element.

The terms in various embodiments of the present disclosure are used to describe a specific embodiment, and are not intended to limit the present disclosure. A singular expression may include a plural expression unless they are definitely different in a context.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art unless clearly defined in the present disclosure.

An electronic device according to various embodiments of the present disclosure may be a device with a communication function. For example, the electronic device may be a smart phone, a tablet Personal Computer (PC), a mobile phone, a video phone, an e-book reader, a desktop PC, a laptop PC, a netbook computer, a PDA, a Portable Multimedia Player (PMP), an MP3 player, a mobile medical device, a camera, a wearable device such as, for example, a Head-Mounted-Device (HMD) such as electronic glasses, electronic clothes, an electronic bracelet, an electronic necklace, an electronic appcessory, an electronic tattoo, and a smart watch.

According to some embodiments, the electronic device may be a smart home appliance with a communication function. The smart home appliances may include at least one of, for example, televisions, digital video disk (DVD) players, audio players, refrigerators, air conditioners, cleaners, ovens, microwaves, washing machines, air purifiers, set-top boxes, TV boxes (e.g., HomeSync™ of Samsung, Apple TV™, or Google TV™), game consoles, electronic dictionaries, electronic keys, camcorders, or electronic frames.

According to some embodiments, the electronic device may include at least one of various medical devices such as a magnetic resonance angiography (MRA) scanner, a magnetic resonance imaging (MRI) scanner, a computed tomography (CT) scanner, an ultrasonograph, or the like, a navigation device, a Global Positioning System (GPS) receiver, an Event Data Recorder (EDR), a Flight Data Recorder (FDR), a vehicle infotainment device, an electronic equipment for ship (for example a ship navigation device and gyro-compass and the like), avionics, a security device, a head unit for vehicle, an industrial or household robot, ATM (automatic teller machine) in banking facilities or POS (point of sales) in stores.

According to some embodiments, the electronic device may include at least one of furniture or a part of a building/structure, an electronic board, an electronic signature receiving device, a projector, and various types of measuring devices (for example, a water meter, an electric meter, a gas meter, a radio wave meter, and the like), where a device may include a camera function. An electronic device according to various embodiments of the present disclosure may be a combination of one or more of the described devices above. Also, an electronic device according to various embodiments of the present disclosure may be a flexible device. Some examples of an electronic device according to various embodiments of the present disclosure have been listed, but the list is not exhaustive.

FIG. 1 is a perspective view of a wireless power charging apparatus 100 according to various embodiments of the present disclosure.

Referring to FIG. 1, the wireless power charging apparatus 100 may include a body 110 that has a cavity 1105 formed therein in which an electronic device 200 is accommodated. A bottom plate 120 is provided on the lower side of the body 110, and a cover 130 is provided on the upper side of the body 110. According to an embodiment, the body 110 forms the sides of the wireless power charging apparatus 100, and the first to fourth sides 1101, 1102, 1103, and 1104 may extend, or may be coupled to each other, to form the body 110 that has a rectangular parallelepiped shape. However, without being limited thereto, the body 110 may also have various types of geometric shapes such as a cylindrical shape, an elliptic cylindrical shape, etc., each of which has a cavity in which the electronic device 200 is accommodated.

According to various embodiments, the bottom plate 120 may be provided on the lower side of the body 110 to seal the cavity 1105, and the cover 130 may be provided on the upper portion of the body 110. According to an embodiment, the cover 130 may be coupled to the body 110 through a coupling member, such as a hinge, etc., so as to be able to be opened/closed. According to an embodiment, the wireless power charging apparatus 100 may form a completely sealed space, or may be formed to be electrically grounded, by the body 110, the bottom plate 120, and the cover 130 while charging. According to an embodiment, the cover 130 may also be equipped so as to be separated from the body 110.

According to various embodiments, the body 110 of the wireless power charging apparatus 100 may be formed of a transparent material. According to various embodiments, at least a part of the body 110 of the wireless power charging apparatus 100 may be formed of a transparent material. According to an embodiment, the region B or the region C of the body 110 of the wireless power charging apparatus 100 may serve as a communication frequency pass region through which the electronic device 200 can establish communication with the outside when in the cavity 1105 to be charged. According to an embodiment, although not illustrated, at least one charging power transmission antenna radiator (not shown) may be disposed at a suitable place in the cavity 1105. According to an embodiment, the electronic device 200 may include a charging power reception antenna radiator (not shown) for receiving wireless power (charging frequency) transmitted by the charging power transmission antenna radiator.

According to various embodiments, the wireless power charging apparatus 100 may be formed of a substantially transparent material so that status information of the electronic device 200, which is being charged in the cavity 1105, can be seen through the wireless power charging apparatus 100. For example, a communication state, notification of a received message, notification of a received call, and the like may be seen through the electronic device 200. According to an embodiment, the wireless power charging apparatus 100 may perform filtering in order to pass a communication frequency of the electronic device 200 through the wireless power charging apparatus 100 and to prevent the wireless power transmitted by the wireless power charging apparatus 100 from being radiated to the outside, thereby efficiently using and charging the electronic device.

Figure 2:
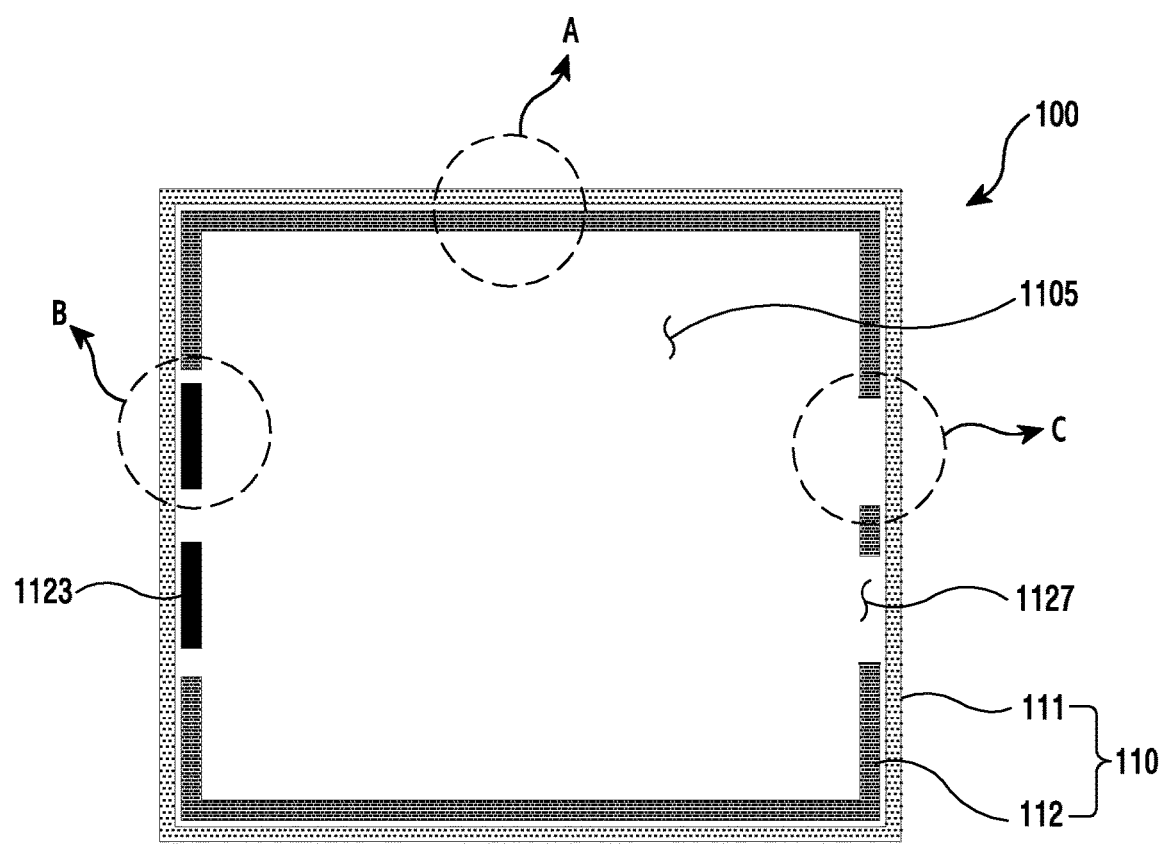
FIG. 2 is a sectional view of major parts of the wireless power charging apparatus, according to various embodiments of the present disclosure.

FIG. 2 is a sectional view of major parts of the wireless power charging apparatus 100, according to various embodiments of the present disclosure.

Referring to FIG. 2, the body 110 may be provided in such a manner that one structure is inside another structure. For example, the body 110 may include a transparent conductor 112 that is adjacent to the inner surface of a transparent dielectric 111, or the transparent conductor 112 may be adjacent to the outer surface of the transparent dielectric 111.

The transparent dielectric 111 may be formed of a non-conductive material. According to an embodiment, the transparent dielectric 111 may be one or more of various materials such as transparent polycarbonate (PC) (e.g., transparent acrylic resin), glass, etc. According to an embodiment, the transparent conductor 112 may be of a film type and may be attached to the inner or outer surface of the transparent dielectric 111. For example, the transparent conductor 112 may be attached to the inner or outer wall of the transparent dielectric 111 by a transparent double-sided tape. The transparent conductor 112 may also be a metal mesh that includes a plurality of metal lines that are arranged on, for example, a transparent polyimide member to cross each other at a pre-determined interval. Various embodiments may have the metal lines of the metal mesh not cross each other, but closely approach each other to a pre-determined interval to form various shapes.

According to various embodiments, the wireless power charging apparatus 100 can exhibit an efficiency equivalent to that of a conventional wireless power charging apparatus in which an opaque metal material is provided on all of the inner surfaces of a cavity 1105. This can be done by adjusting the interval between the metal lines, which constitutes the metal mesh of the transparent conductor 112, and the thickness of the metal lines. In this state, communication frequency pass regions B and C may be formed in the body 110 to allow the electronic device 200, which is accommodated in the cavity 1105 for the purpose of charging, to communicate with the outside. According to an embodiment, a communication frequency cannot pass through the region A from the cavity 1105 to the outside, but can pass through the regions B and C from the cavity 1105 to the outside. According to an embodiment, the regions B and C may be placed at intervals in the body 110, and a plurality of regions B and regions C may be formed.

According to various embodiments, the region B through which a communication frequency passes may include a metal periodic structure in which a plurality of unit metal structures 1123 are arranged in a non-conductive region of the body 110. The region C through which a communication frequency passes may include a slot periodic structure in which a plurality of unit slots 1127 is formed in a conductive region of the body 110.

The metal periodic structure and the slot periodic structure will be described in more detail in reference to other figures.

Figure 3:
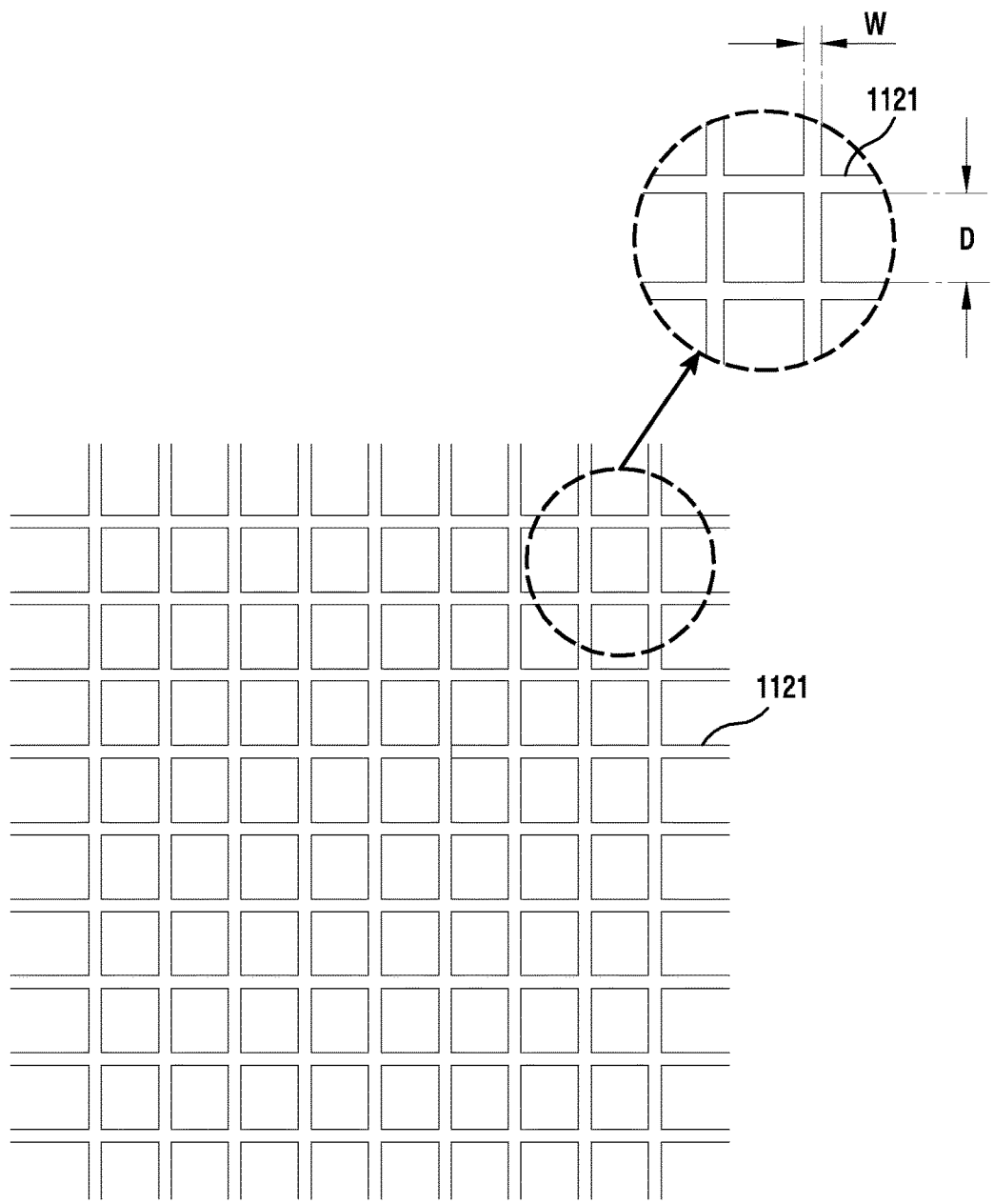
FIG. 3 is a diagram illustrating a major part of a transparent conductor for a wireless power charging apparatus, according to various embodiments of the present disclosure.
Figure 4A:
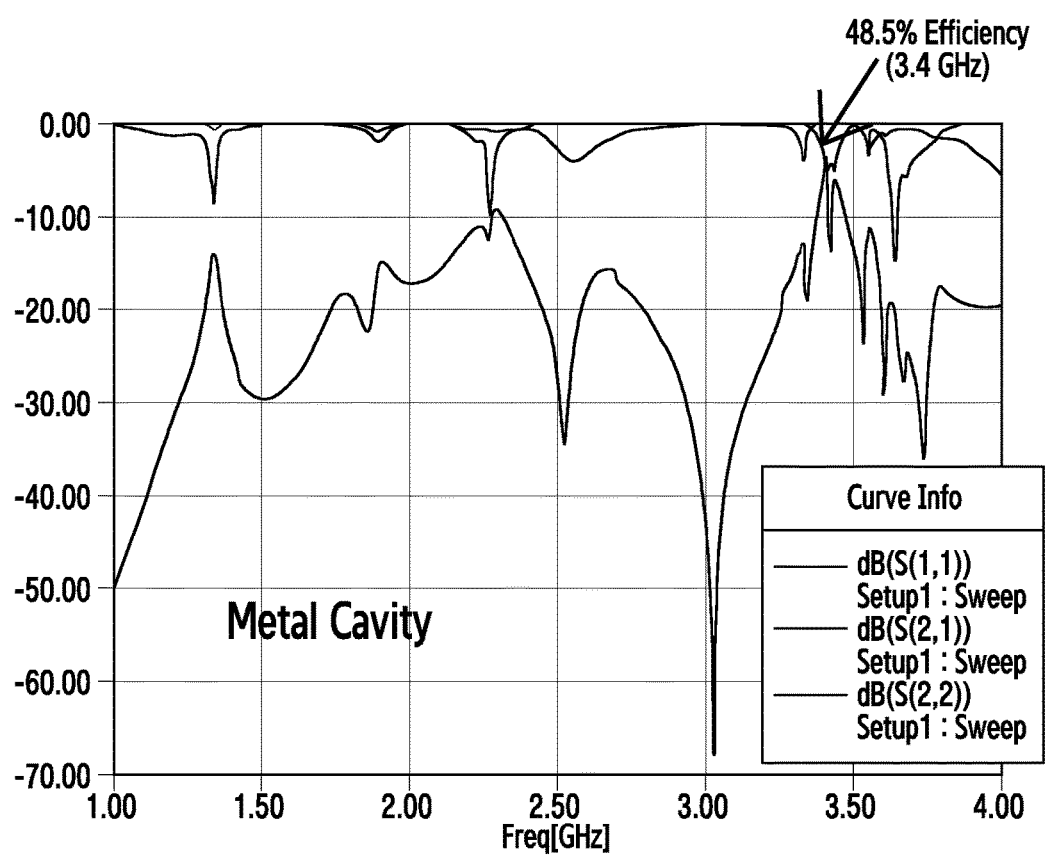
FIGS. 4A to 4C are graphs illustrating charging efficiency of various designs of a metal mesh of a transparent conductor, according to various embodiments of the present disclosure.
Figure 4B:
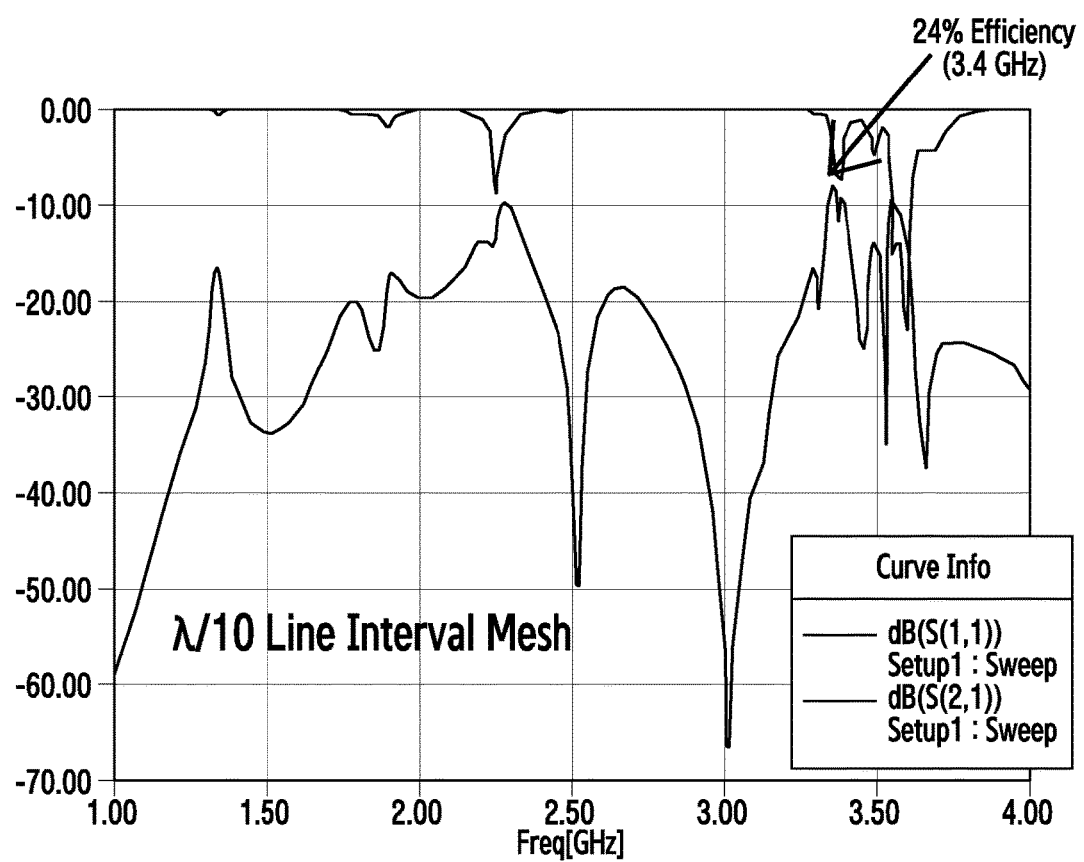
Figure 4C:
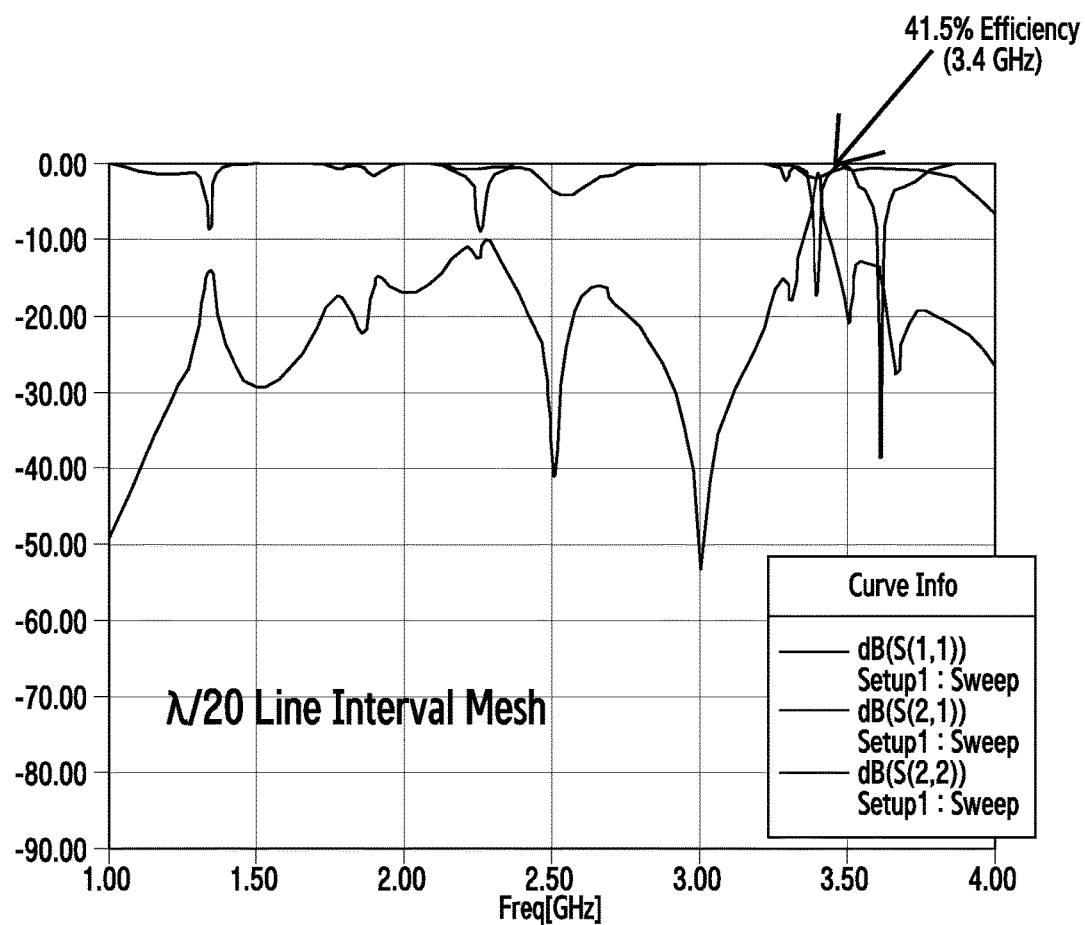

FIG. 3 is a diagram illustrating a major part of a transparent conductor that is applied to a wireless power charging apparatus, according to various embodiments of the present disclosure. FIGS. 4A to 4C are graphs illustrating charging efficiency for various designs of a metal mesh of a transparent conductor, according to various embodiments of the present disclosure.

Referring to FIG. 3, the transparent conductor may include a plurality of metal lines 1121. The metal lines 1121 may be arranged to cross each other at right angles, but they are not limited thereto. The metal lines 1121 may also be arranged to cross each other at other pre-determined angles.

According to various embodiments, the charging efficiency of an electronic device may be controlled by adjusting the interval D between the metal lines 1121 of the transparent conductor and the thickness W of the metal lines 1121.

As illustrated in FIG. 4A, when a charging frequency of 3.4 GHz band was used, and a conventional opaque conductor was used, air transmission efficiency (e.g., power-transfer efficiency) was 48.5%, and as illustrated in FIG. 4B, when the interval between metal lines was λ/10 with the same charging frequency, the air transmission efficiency was 24%. λ may be the wavelength of the transmitted wireless power. In addition, as illustrated in FIG. 4C, when the interval between metal lines was λ/20 with the same charging frequency, air transmission efficiency was 41.5%. Therefore, it can be seen that a better charging efficiency was obtained as the interval between the metal lines was reduced. Accordingly, if a wearable electronic device should have an air transmission efficiency of substantially 30% or more, the metal lines may have an interval of λ/20 or less.

In addition, it can be seen from Table 1 below that the air radiation efficiency changed when the interval between the lines was adjusted while keeping the same line thickness.

TABLE 1

Maximum Air efficiency

| | | |
|---|---|---|
| | Opaque Cavity (Metal Wall) | −2.55 dB (55.5%) |
| FPCB Cavity (Mesh Wall) | Line width 0.05 mm Interval 0.95 mm | −2.84 dB (51.9%) |
| | Line width 0.05 mm Interval 0.35 mm | −2.61 dB (54.8%) |

As listed in Table 1, when a conventional opaque conductor was tested, the air radiation efficiency was 55.5%, and according to exemplary embodiments of the present disclosure, when metal lines with a line thickness of 0.05 mm and a line interval of 0.95 mm were applied as a transparent conductor, the air radiation efficiency was 51.9%, and when metal lines with the same line thickness of 0.05 mm and a line interval of 0.35 mm were applied as a transparent conductor, the air transmission efficiency was 54.8%. Namely, it can be seen that as the interval between the metal lines was reduced, the air radiation efficiency approached the air radiation efficiency of the conventional opaque conductor.

Figure 4D:
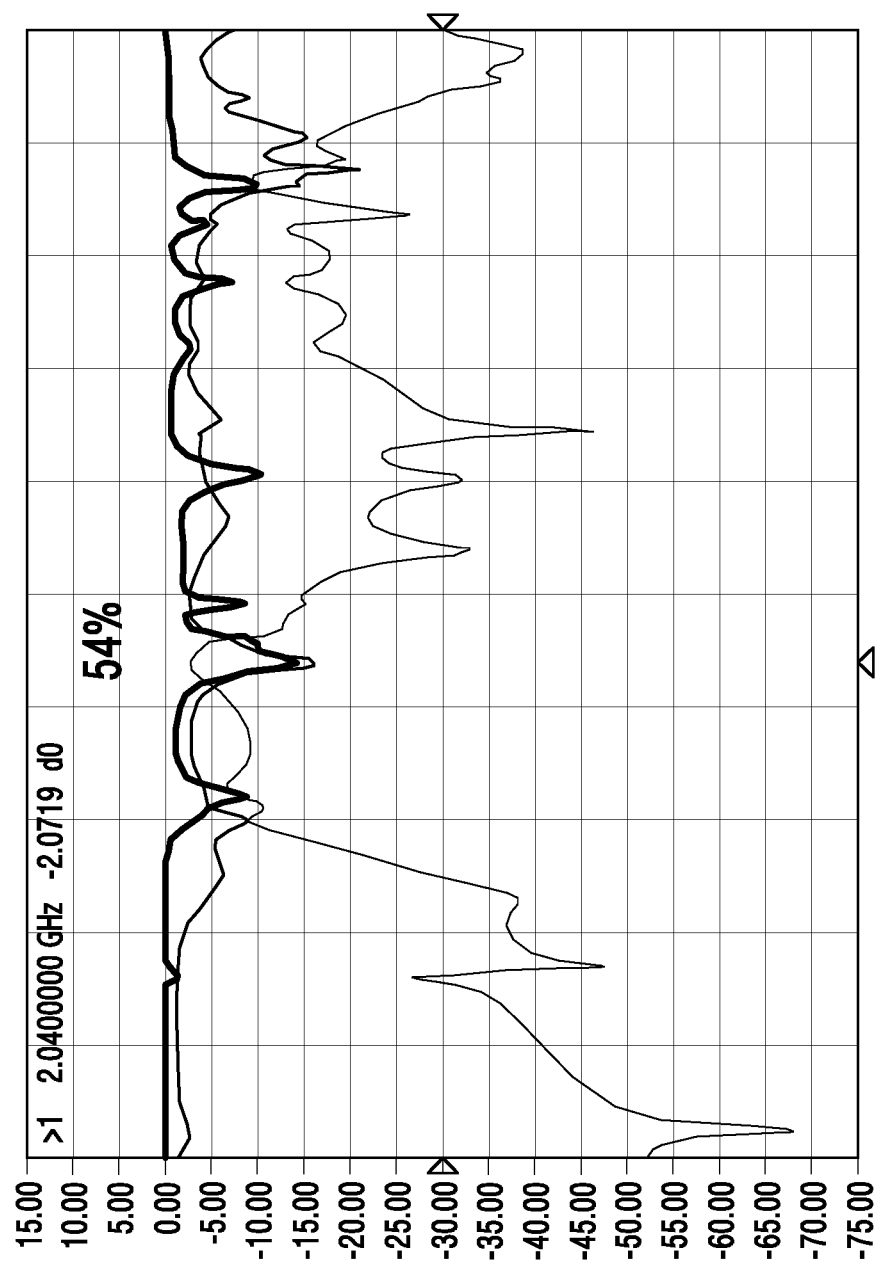
FIG. 4D is a graph illustrating the charging efficiency depending on a change in the shape and size of a cavity of a wireless power charging apparatus, according to various embodiments of the present disclosure.

FIG. 4D is a graph illustrating a charging efficiency depending on change in the shape and size of a cavity of a wireless power charging apparatus, according to various embodiments of the present disclosure.

Referring to FIG. 4D and Table 2 below, air radiation efficiency is listed for different shapes for a transparent conductor.

TABLE 2

| Type | Size | Maximum Efficiency |
|---|---|---|
| Cylinder | Diameter 15 cm Height 7.5 cm | 55% |
| Rectangular | 12 cm × 9 cm × 5 cm | 54% |

As listed in Table 2, for a cylindrical body that has a diameter of 15 cm and a height of 7.5 cm, the maximum air radiation efficiency was 55%, and a rectangular body with dimensions of 12 cm×9 cm×5 cm had a maximum air radiation efficiency of 54%. Accordingly, it can be seen that excellent air radiation efficiency was exhibited for different types of body for the transparent conductor with metal lines (a metal mesh).

FIGS. 5A to 5D illustrate Frequency Selective Surfaces (FSSs) of a wireless power charging apparatus that represent a bandstop characteristic, according to various embodiments of the present disclosure.

According to various embodiments, a non-conductive region 1122 may be formed in an area of a transparent conductor 112. The corresponding transparent conductor may be configured such that the wireless power frequency (e.g., in a band of 2.4 GHz) is blocked by the non-conductive region 1122 and metal periodic structures formed in the non-conductive region 1122.

Figure 5A:
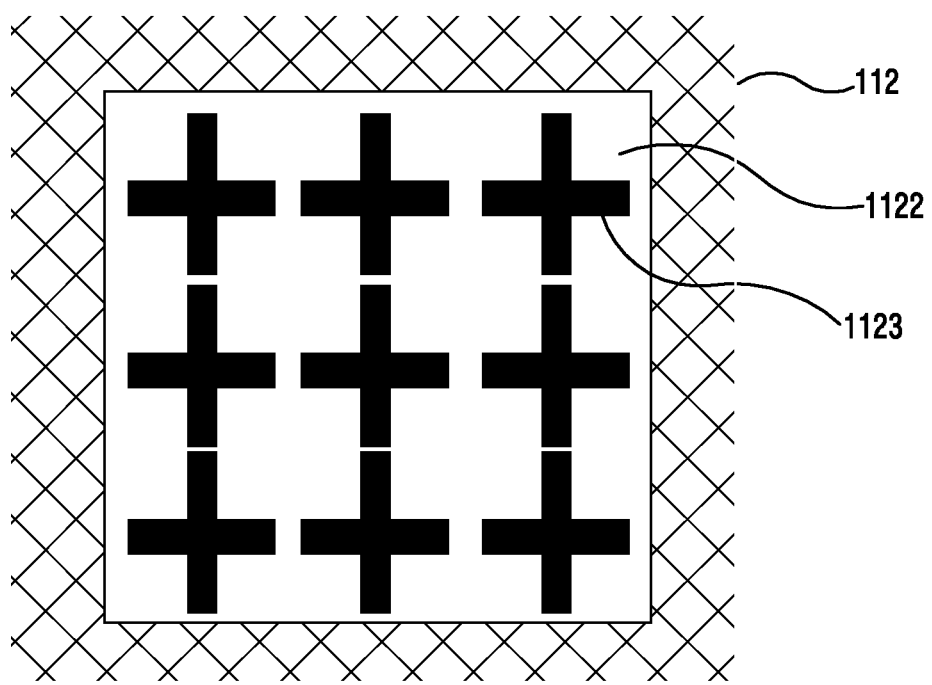
FIGS. 5A to 5D illustrate Frequency Selective Surfaces (FSSs) of a wireless power charging apparatus that represent a band stop characteristic, according to various embodiments of the present disclosure.
Figure 5B:
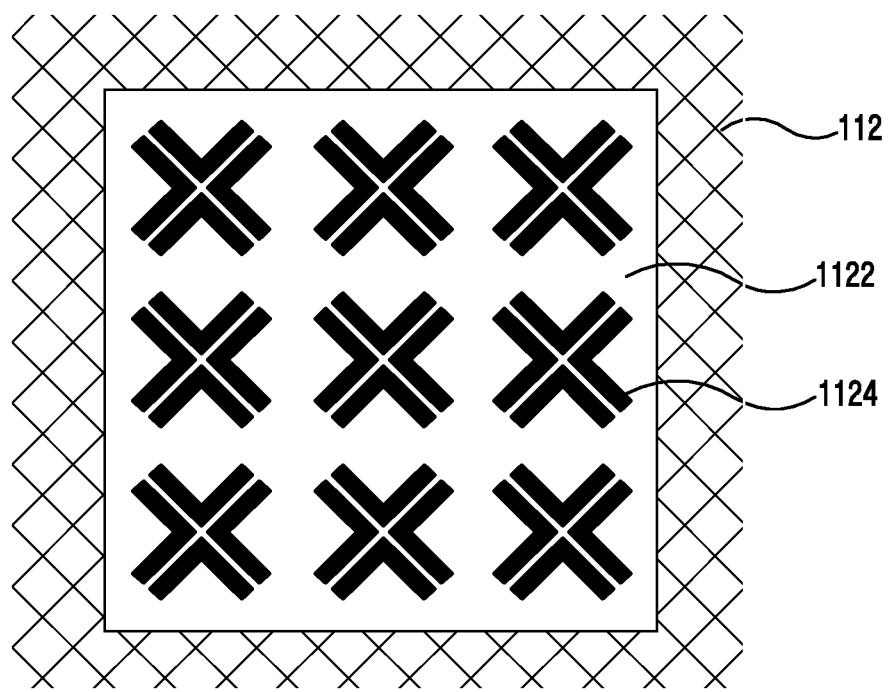
Figure 5C:
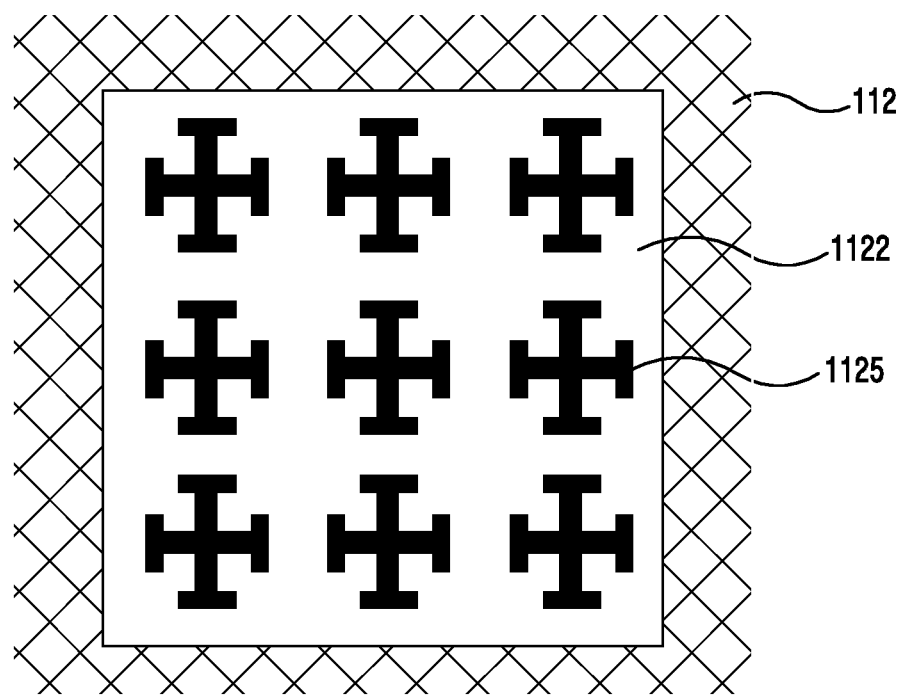

Referring to FIGS. 5A to 5C, the non-conductive region 1122 may be formed in an area of the transparent conductor 112. According to an embodiment, the non-conductive region 1122 may be a dielectric region with no metal lines disposed on the transparent conductor 112 (which may be a metal mesh, for example). When the transparent conductor 112 is formed in the shape of a film, the non-conductive region 1122 may also be formed in such a manner that the transparent conductor 112 is not present in the non-conductive region 1122.

According to an embodiment, unit metal structures 1123 (FIG. 5A) may be arranged at a pre-determined interval in the non-conductive region 1122. According to an embodiment, the unit metal structures 1123 may also be formed in other shapes 1124 and 1125 as shown in FIGS. 5B and 5C.

Figure 5D:
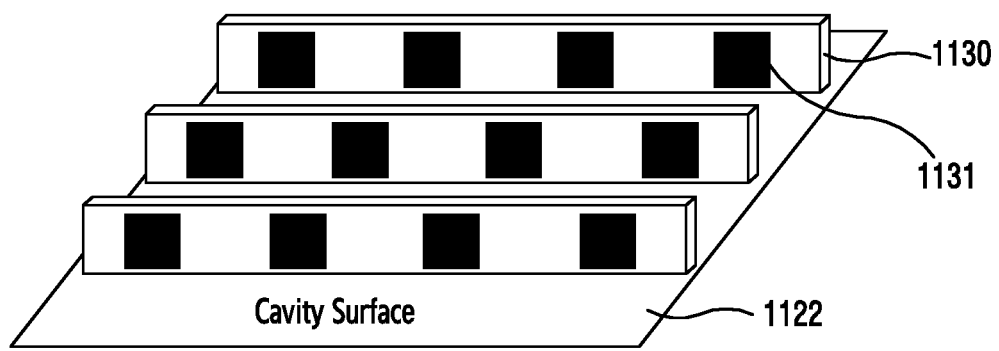

Referring to FIG. 5D, dielectric ribs 1130 may protrude from the non-conductive region 1122, which is formed on the transparent conductor 112. The dielectric ribs 1130 may be separated by a pre-determined interval, and conductive patches 1131 may be arranged on (attached to) the dielectric ribs 1130 at another pre-determined interval, whereby metal periodic structures may be formed.

Figure 5E:
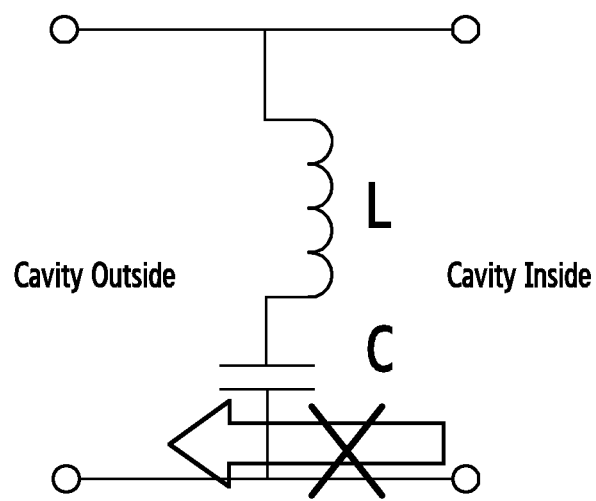
FIGS. 5E and 5F are an equivalent circuit diagram and an S21 graph depending on the bandstop characteristic of FIGS. 5A to 5D, respectively, according to various embodiments of the present disclosure.
Figure 5F:
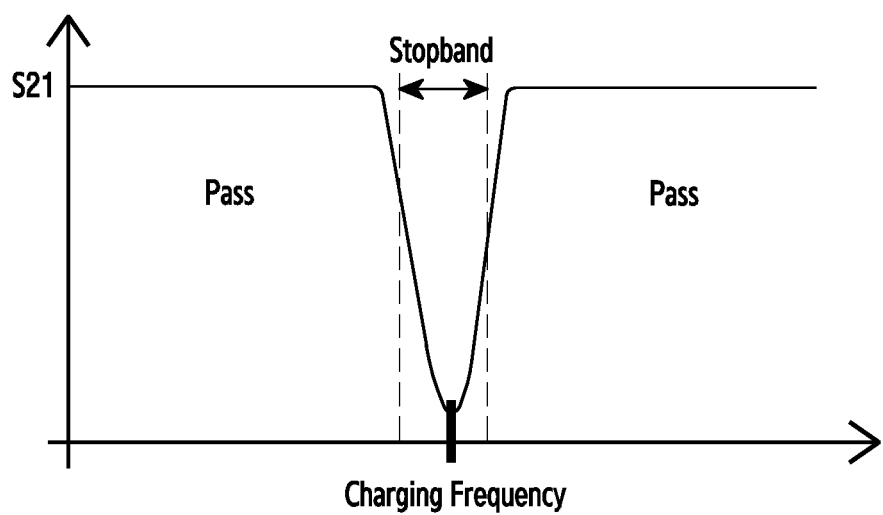

FIGS. 5E and 5F are an equivalent circuit diagram and an S21 graph, respectively, generally depicting the bandstop characteristics of FIGS. 5A to 5D according to various embodiments of the present disclosure.

Referring to FIGS. 5E and 5F, the metal periodic pattern structure formed in the non-conductive region 1122 of the transparent conductor 112, according to various exemplary embodiments of the present disclosure, physically forms a series LC circuit and has an impedance of 0 at its resonant frequency (bandstop center frequency). Accordingly, the metal periodic pattern structure can shunt signals in the corresponding bandstop frequency range to ground, thereby blocking signals in the bandstop frequency range.

Figure 6A:
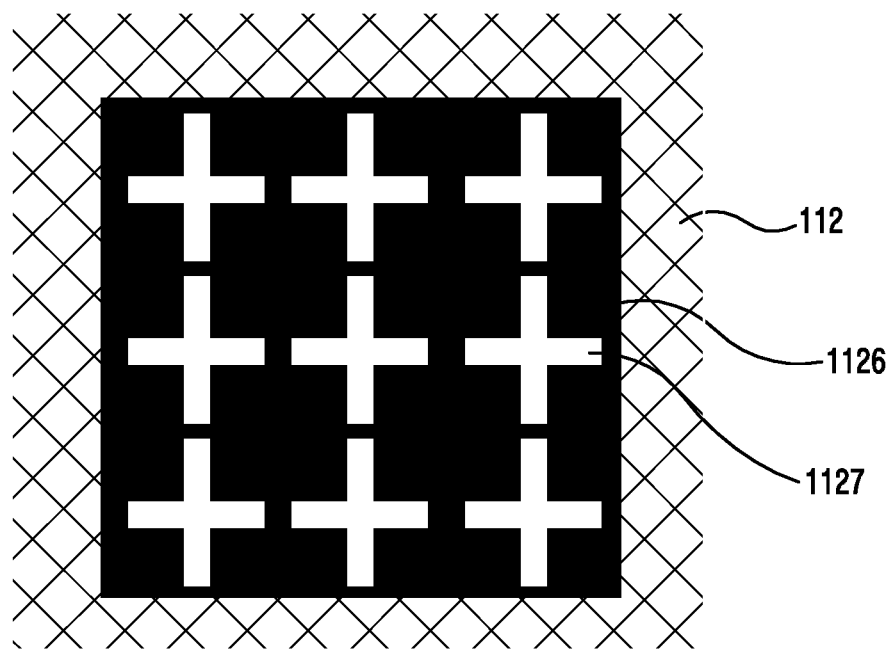
FIGS. 6A and 6B illustrate Frequency Selective Surfaces (FSSs) of a wireless power charging apparatus that represent a bandpass characteristic, according to various embodiments of the present disclosure.
Figure 6B:
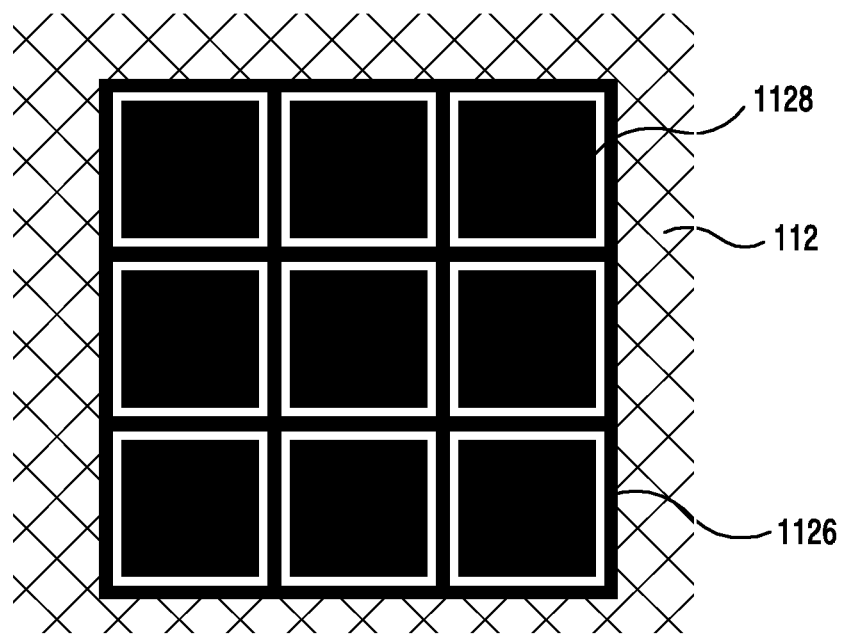

FIGS. 6A and 6B illustrate Frequency Selective Surfaces (FSSs) of a wireless power charging apparatus that represent a bandpass characteristic, according to various embodiments of the present disclosure.

According to various embodiments, a conductive region 1126 may be formed in an area of a transparent conductor 112, and a slot periodic structure in which a plurality of unit slots 1127 are uniformly arranged may be applied to the conductive region 1126, whereby the transparent conductor 112 may be configured to pass frequencies in a specific band. According to an embodiment, the transparent conductor 112 may be configured to pass a communication frequency (e.g., in a band of 900 MHz or in a band of 1800 MHz) through the slot periodic structure region of the corresponding transparent conductor 112. According to an embodiment, the unit slots 1127 and 1128 may be formed in the conductive region 1126, which may be separately provided on the transparent conductor 112, or in an existing metal mesh.

Figure 6C:
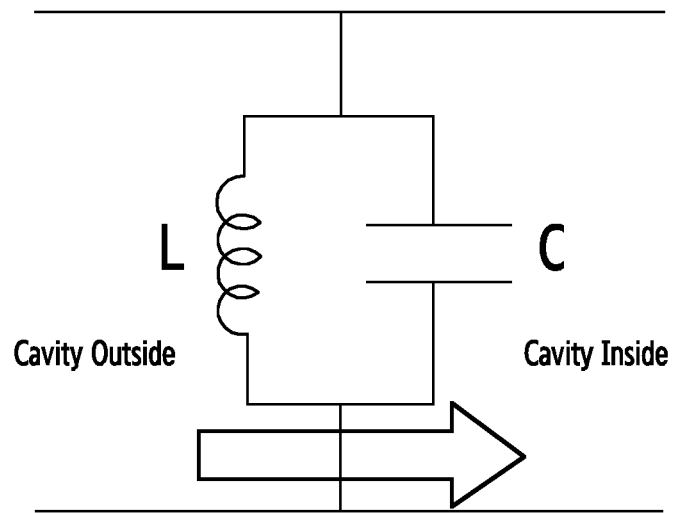
FIGS. 6C and 6D are an equivalent circuit diagram and an S21 graph depending on the bandpass characteristic of FIGS. 6A and 6B, respectively, according to various embodiments of the present disclosure.
Figure 6D:
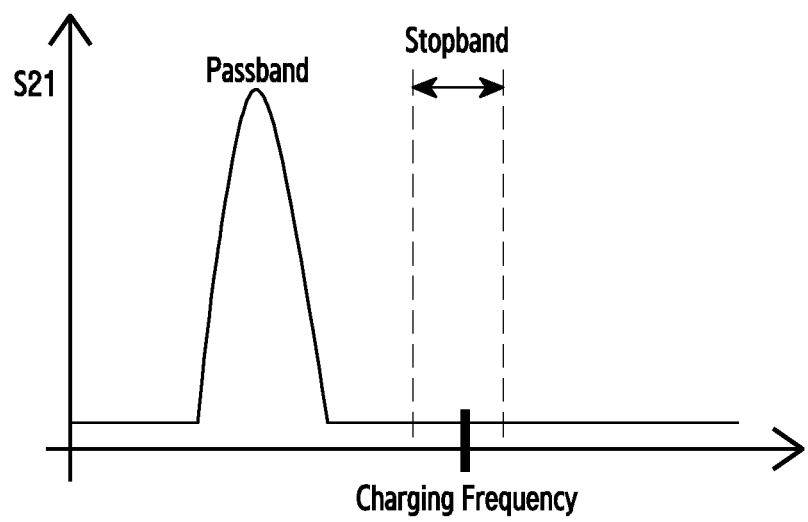

FIGS. 6C and 6D are an equivalent circuit diagram and an S21 graph, respectively, generally depicting the bandpass characteristics of FIGS. 6A to 6B, according to various embodiments of the present disclosure.

Referring to FIGS. 6C and 6D, the slot periodic structure, according to the exemplary embodiment of the present disclosure, formed in the conductive region 1126 of the transparent conductor 112 may physically form a parallel LC with infinite impedance at its resonant frequency (bandpass center frequency). Therefore, the slot periodic structure may shunt signals to ground except for the signals having frequencies in the corresponding frequency band (bandpass characteristic).

Figure 7A:
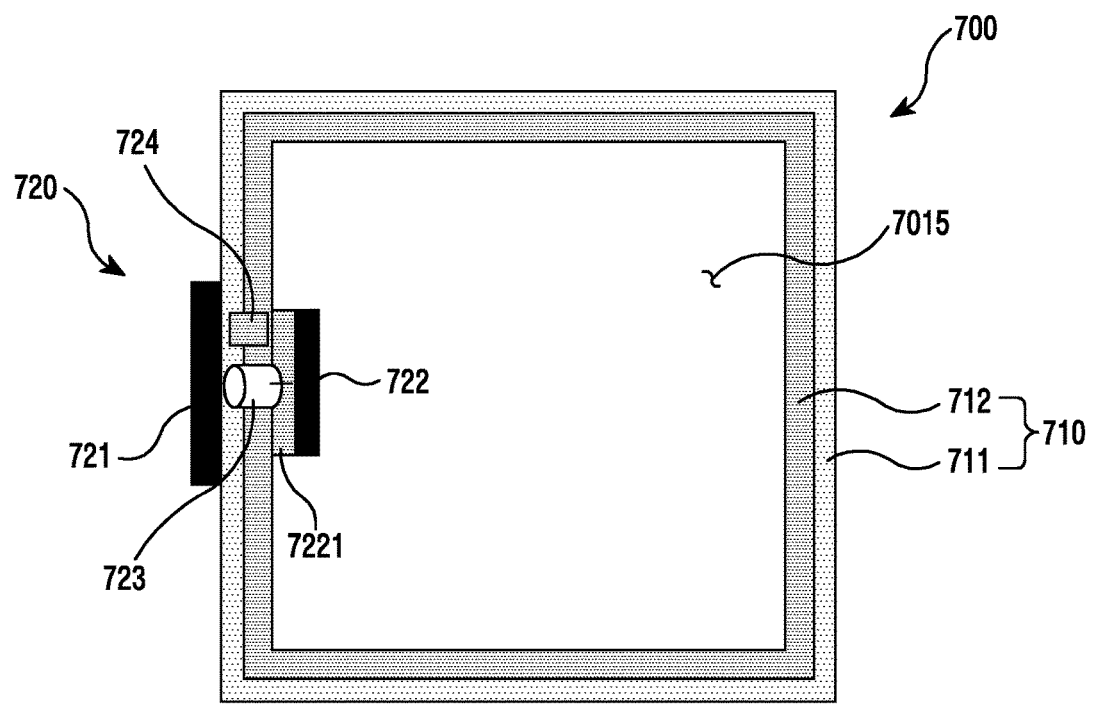
FIG. 7A illustrates a wireless power charging apparatus that includes a communication repeater, according to various embodiments of the present disclosure.
Figure 7B:
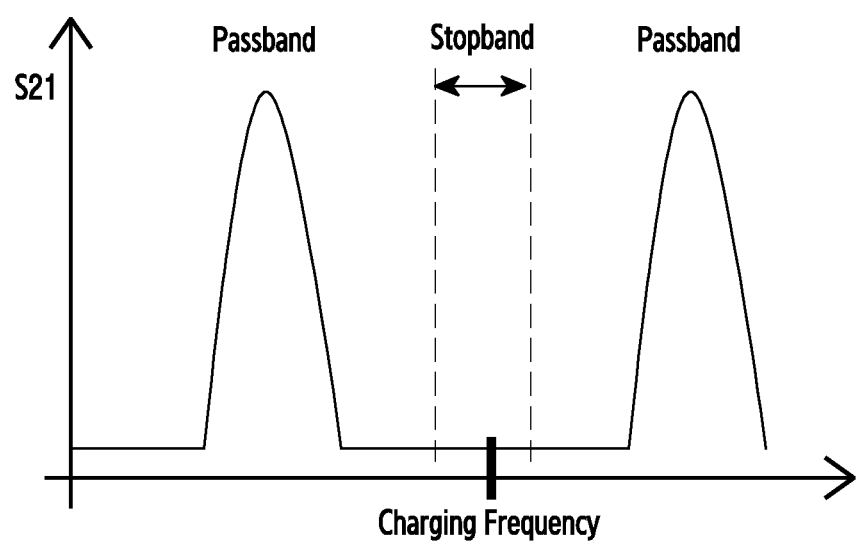
FIG. 7B is an S21 graph illustrating a frequency characteristic according to an operation of the communication repeater of FIG. 7A, according to various embodiments of the present disclosure.

FIG. 7A illustrates a wireless power charging apparatus 700 that includes a communication repeater 720, according to various embodiments of the present disclosure. FIG. 7B is an S21 graph illustrating a frequency characteristic according to an operation of the communication repeater 720 of FIG. 7A, according to various embodiments of the present disclosure.

Referring to FIG. 7A, the wireless power charging apparatus 700 may further include the communication repeater 720 in the body 710. According to an embodiment, the communication repeater 720 may be configured to selectively transmit and receive a communication frequency band of an electronic device that is being charged.

According to various embodiments, the wireless power charging apparatus 700 may include the body 710, similar to that illustrated in FIG. 2, with the cavity 7015 in which an electronic device is accommodated. The body 710 may include a transparent dielectric 711 and a transparent conductor 712 that is provided on the inner surface of the transparent dielectric 711. According to an embodiment, the transparent conductor 712 may include a metal mesh that is formed by metal lines that cross or closely approach each other in various manners, and may be attached to the inner wall of the transparent dielectric 711.

According to various embodiments, the communication repeater 720 may comprise a first antenna radiator 721 on the outer wall of the body 710, and a second antenna radiator 722 on the inner wall of the cavity 7015. The first and second antenna radiators 721 and 722 may be patch type radiators that have a low-profile. In this case, the first and second antenna radiators 721 and 722 may be bonded to the outer wall and the inner wall of the body 710, respectively. According to an embodiment, a spacing dielectric 7221 may be interposed for insulation between the second antenna radiator 722 and the inner wall of the cavity 7015, that is, a face of the transparent conductor 712.

According to various embodiments, the first and second antenna radiators 721 and 722 may include a transmission line 723 that passes through the body of the wireless power charging apparatus. The transmission line 723 may be electrically connected to the first and second antenna radiators 721 and 722. The transmission line 723 may be, for example, a coaxial cable that passes through the body 710, a flexible printed circuit board (FPCB), etc. According to an embodiment, a charging bandstop filter 724 may be provided for the transmission line 723. The charging bandstop filter 724 may block wireless power frequency signals from being transmitted to the outside through the first antenna radiator 721, and may include elements such as the inductor L, the capacitor C, etc.

As illustrated in FIG. 7B, it can be seen that the wireless power charging apparatus 700 has a dual band resonance characteristic due to the patch-type first and second antenna radiators 721 and 722, and wireless power signals do not pass (bandstop characteristic).

According to the various embodiments, the wireless power charging apparatus enables a user to see the status information of an electronic device with his/her eyes while the electronic device is being recharged, and enables the electronic device to communicate with an external device, thereby enhancing user convenience.

Various embodiments of the present disclosure disclosed in the specification and the drawings are only particular examples proposed in order to easily describe the technical matters of the present disclosure and help with comprehension of the present disclosure, and do not limit the scope of the present disclosure. Therefore, in addition to various embodiments disclosed herein, the scope of the various embodiments of the present disclosure should be construed to include all modifications or modified forms based on the various embodiments described and teaching of the present disclosure.

What is claimed is:

1. A wireless power charging apparatus comprising:
   a transparent dielectric body including a cavity for accommodating an electronic device;
   a transparent conductor mounted on a wall of the transparent dielectric body configured to substantially block wireless power to outside the cavity; and
   at least one frequency filtering region disposed in the transparent conductor configured to pass a communication frequency of the electronic device and substantially block the wireless power to outside the cavity.

2. The wireless power charging apparatus of claim 1, wherein the transparent conductor is a metal mesh in which metal lines are formed to cross each other on a transparent dielectric film.

3. The wireless power charging apparatus of claim 2, wherein an interval between the metal lines does not exceed λ/10, wherein λ is a wavelength of the wireless power.

4. The wireless power charging apparatus of claim 2, wherein the metal lines are formed to cross each other at right angles or at pre-determined angles.

5. The wireless power charging apparatus of claim 2, wherein the metal mesh is attached to an inner or outer wall of the transparent conductor.

6. The wireless power charging apparatus of claim 1, wherein the transparent conductor is a metal mesh in which metal lines are formed on a transparent dielectric film.

7. The wireless power charging apparatus of claim 1, wherein the at least one frequency filtering region comprises:
   a non-conductive region formed on the transparent conductor; and
   a metal periodic structure that comprises a plurality of unit metal structures that are arranged in the non-conductive region at a pre-determined interval and have a pre-determined shape,
   wherein the frequency filtering region is configured to substantially block the wireless power therethrough.

8. The wireless power charging apparatus of claim 7, wherein the metal periodic structure is attached to an inner surface of the transparent conductor.

9. The wireless power charging apparatus of claim 1, wherein the at least one frequency filtering region comprises:
   a non-conductive region formed on the transparent conductor;
   a plurality of dielectric ribs that protrude from the non-conductive region and are arranged at a first pre-determined interval; and
   a metal periodic structure that comprises a plurality of conductive patches arranged on each of the dielectric ribs at a second pre-determined interval,
   wherein the frequency filtering region is configured to substantially block the wireless power therethrough.

10. The wireless power charging apparatus of claim 1, wherein the frequency filtering region comprises:
    a conductive region formed on the transparent conductor; and a slot periodic structure that comprises a plurality of unit slots that are arranged in the conductive region at a pre-determined interval and have a pre-determined shape, wherein the frequency filtering region is configured to pass the communication frequency of the electronic device therethrough.

11. The wireless power charging apparatus of claim 10, wherein the transparent conductor is a metal mesh in which metal lines are formed to cross each other on a transparent dielectric film, and the unit slots are formed where the metal mesh is omitted.

12. The wireless power charging apparatus of claim 10, wherein the conductive region is formed on the transparent conductor.

13. The wireless power charging apparatus of claim 1, wherein the frequency filtering region comprises a repeater configured to pass the communication frequency of the electronic device therethrough.

14. The wireless power charging apparatus of claim 13, wherein the repeater comprises:

a first antenna radiator disposed on an outer surface of the transparent dielectric body;

a second antenna radiator disposed on an inner surface of the transparent conductor; and a transmission line for electrically connecting the first and second antenna radiators, wherein when the electronic device is accommodated in the cavity, the electronic device is configured to communicate to the outside via the first and second antenna radiators.

15. The wireless power charging apparatus of claim 14, wherein a dielectric is interposed between the transparent conductor and the second antenna radiator.

16. The wireless power charging apparatus of claim 14, further comprising:

a charging band stop filter provided on the transmission line, and is-configured to substantially block the wireless power from being transferred to the first antenna radiator from the second antenna radiator.

17. A wireless power charging apparatus comprising:

a bottom plate;

a side plate that has a pre-determined height along a periphery of the bottom plate and forms a cavity for accommodating an electronic device; and a cover provided on an upper portion of the side plate, wherein the cover is configured to be able to open and close, and to seal the cavity by being closed when the electronic device is being charged, wherein the side plate comprises:

transparent dielectric material having the pre-determined height and forming the cavity;

a transparent conductor mounted on an inner or outer wall of the transparent dielectric material configured to substantially block wireless power within the cavity from being radiated outside the cavity; and at least one frequency filtering region disposed in the transparent conductor configured to pass a communication frequency of the electronic device and substantially block the wireless power to outside the cavity.

18. The wireless power charging apparatus of claim 17, wherein the frequency filtering region comprises:

a non-conductive region formed on the transparent conductor; and a metal periodic structure that comprises a plurality of unit metal structures that are arranged in the non-conductive region at a pre-determined interval and have a pre-determined shape, wherein the frequency filtering region is configured to substantially block the wireless power therethrough.

19. The wireless power charging apparatus of claim 17, wherein the frequency filtering region comprises:

a conductive region formed on the transparent conductor; and a slot periodic structure that comprises a plurality of unit slots that are arranged in the conductive region at a pre-determined interval and have a pre-determined shape, wherein the frequency filtering region is configured to substantially pass the communication frequency of the electronic device therethrough.

* * * * *